United States Patent [19]

Thor

[11] Patent Number: 4,470,440

[45] Date of Patent: Sep. 11, 1984

[54] IMPACT PRODUCING TOOL

[76] Inventor: Harry A. Thor, 393 Bunn Hill Rd., Vestal, N.Y. 13850

[21] Appl. No.: 430,171

[22] Filed: Sep. 30, 1982

[51] Int. Cl.³ .......................... A47J 49/02; B27L 7/00

[52] U.S. Cl. .................................. 144/193 C; 81/463; 145/61 F; 173/90; 173/139

[58] Field of Search .................... 173/90, 91, 132, 139; 144/193 C, 193 D; 145/61 F, 61 M; 81/463; 29/254, 275, 276, 277

[56] References Cited

U.S. PATENT DOCUMENTS

| | | | |
|---|---|---|---|
| 52,853 | 2/1866 | Howe | 173/90 |
| 875,940 | 1/1908 | Mason | 145/61 F |
| 1,110,969 | 9/1914 | Stacy | 145/61 F |
| 2,475,041 | 7/1949 | Mattson | 173/91 |
| 3,036,482 | 5/1962 | Kenworthy et al. | 173/90 |
| 3,113,478 | 12/1963 | Hall, Jr. et al. | 173/91 |
| 3,119,423 | 1/1964 | Weick | 145/61 F |
| 3,696,873 | 10/1972 | Anderson | 173/90 |
| 4,294,298 | 10/1981 | Otte, Jr. | 144/193 C |
| 4,316,513 | 2/1982 | Harris | 173/91 |
| 4,327,787 | 5/1982 | Loratto | 173/91 |

FOREIGN PATENT DOCUMENTS

| | | | |
|---|---|---|---|
| 2031484 | 4/1980 | United Kingdom | 173/91 |

*Primary Examiner*—Frank T. Yost
*Assistant Examiner*—Hien H. Phan
*Attorney, Agent, or Firm*—Neil F. Markva

[57] ABSTRACT

An impact producing tool has a longitudinal axis with an impacting working head member rigidly connected to the end of a housing. An elongated handle is floatingly connected to and extends from the impacting head member and out of an opening disposed an end cap portion at the other end of the housing. A positioning member is located on the impacting head member and has a structural configuration effective to maintain the elongated handle at a predetermined position with respect to the impacting working head member. A hammer element is movably disposed on the elongated handle and is effective to apply a striking force on the impact receiving end of the housing. The impacting working head member has a structural configuration effective to act on a workpiece or work surface when the striking force is applied to the impact receiving end of the housing. The floating connection between the elongated handle and the housing overcomes a basic problem of structural deficiencies associated with handles rigidly connected to a housing element. A particular feature of the invention is the interchangeability of working head members which accomplish various functions with respect to the impact producing tool.

13 Claims, 10 Drawing Figures

14
26
25
VI
VI
28
18
24
10
16
20
A
22
12
30

25
14
26
28

32
14
58
26
18
24

IMPACT PRODUCING TOOL

FIELD OF THE INVENTION

This invention relates to impact producing tools. More particularly, the invention relates to impact producing tools for effecting wood splitting, crushing, tamping or digging, wherein a hammer member acts along an elongated rod for effecting a striking force to be applied to the working tool.

BACKGROUND OF THE INVENTION

Various types of known impact tools have been designed to apply a striking force to an impacting head member having a particular configuration. These configurations are designed to perform various types of work such as breaking rocks, splitting wood, digging holes, or acting as a hammer for simply applying an impact force on a tool bit which in turn penetrates a workpiece or a work surface such as the earth.

This type of impact tool is described in U.S. Pat. Nos. 2,475,041, 3,381,763, 3,050,095 and 3,568,657. All of these prior art impact tools have working heads rigidly mounted at one end of an elongated handle with the hammer element directly striking the working head. This type of prior art construction has obvious drawbacks. Not only are the welded portions of the elongated handle and the working head required to absorb much of the striking force but after each strike there is a large amount of recoil action on the hammer element. In U.S. Pat. No. 2,475,041, the working head is inserted within the elongated handle along a substantial distance and a retaining screw element maintains the working head in the elongated handle. This prior art construction requires an additional jacket element to receive the striking blows from the hammer and transfer the force to a working head. Further, it does not prevent the recoiling of the hammer element.

When the working impact head is hit directly by the hammer element of the prior art, the reactive forces developed cause the recoiling of the hammer member and/or causes the elongated handle of the impact tool to jump backwardly away from the workpiece. The disadvantages of this type of reaction is deemed clearly understood.

PURPOSE OF THE INVENTION

It is a primary object of the invention to provide a unique impact producing tool having a connection between the elongated handle and the working head which will not be subjected to the excessive forces and the recoiling of the weight element as found in the prior art structures.

Another object of the invention is to provide an impact producing tool which may be readily adapted to a variety of impact requiring tasks.

A further object of the invention is to provide impact producing tool wherein the disadvantages associated with the prior art impact producing tools of this type are overcome.

SUMMARY OF THE INVENTION

The impact producing tool as described and disclosed herein includes an impacting head member disposed at one end of a housing and an elongated handle floatingly connected to and extending from the impact working head member. The handle extends outwardly through an opening located at the other end of the housing.

Positioning means are rigidly connected to the working head member and are effective to maintain the elongated handle at a predetermined location with respect to the working head during operation of the impact producing tool. A hammer element is movably disposed along the elongated handle and is effective to apply a striking force at the distal end of the housing.

A particular feature of the invention is directed to the use of a dampening means disposed between the hammer element and the working head member. The dampening means prevents the recoiling of the hammer element after it strikes the impact receiving portion located at the distal end of the housing.

Another feature of the invention is directed to the use of a prying means which is located on the outside of the housing and is effective to act as a prying element when the working head member might become stuck in the workpiece or the work surface to which it is being applied.

A still further feature of the invention is directed to the use of a working head portion that is removably mounted at the end of the housing. The working head portion may have (1) a cutting edge for splitting wood or (2) a pointed tool bit for penetrating hard objects such as earth, rock, metal and the like, or (3) a flat tamping surface element or (4) a hollow structure for digging holes in the earth.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DETAILED DESCRIPTION

Figure 1:
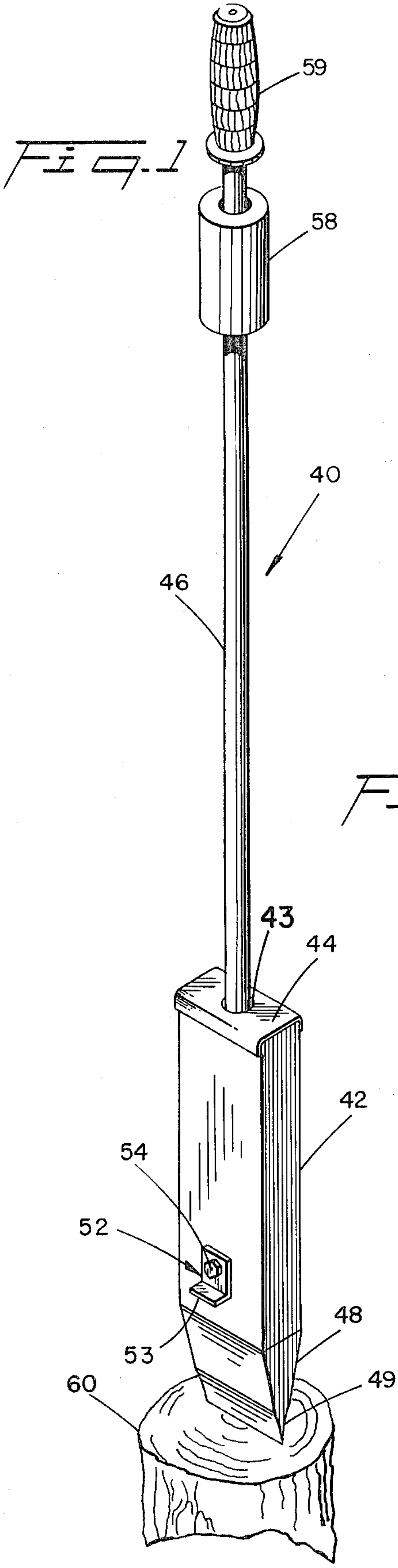
FIG. 1 is a perspective view of a tool made in accordance with this invention shown with the hammer member in an impact-ready position.
Figure 2:
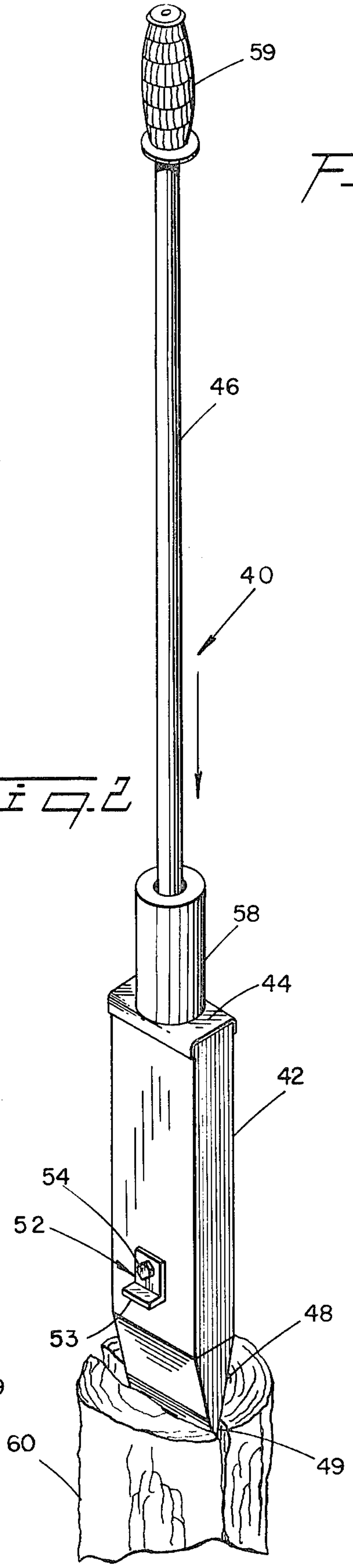
FIG. 2 is a perspective view of the device of FIG. 1, showing the hammer member in an impact position with the head member penetrating the workpiece.

The impact producing tool 40 shown in FIGS. 1 and 2 includes an impacting head member 48 having a wedge with a tool bit 49.

Bolt 54 and nut 56 join elongated handle 46 to head member 48 through housing 42 with handle 46 extending therefrom along the longitudinal axis of tool 40.

Head member 48 includes a positioning member 50 which may be an integral part thereof or a separate part rigidly connected thereto. The end of the elongated tubular handle 46 receives the postioning member 50 thereby maintaining handle 46 at a predetermined position with respect to the working head 48.

In this embodiment, bolt 54 extends through slotted openings 55 formed in handle 46. This configuration enables the handle 46 to move longitudinally with respect to the tool 40 with respect to the fixedly positioned bolt 54. Positioning member 50 is long enough so that the handle 46 will never move out of contact therewith. Thus, any contact that the inside periphery of the openings 55 may have with bolt 54 is a sliding contact and any impact made by the hammer 58 will not be transferred to the handle 46 at the connecting point with bolt 54.

Handle 46 passes through an opening 43 in impact receiving cap 44 disposed at the top of housing 42. Handle 46 is again in sliding contact with the sides of opening 43 so that handle 46 is in no way adversely effected by any impact that would be applied by the impact hammer 58 onto the impact receiving cap 44.

As shown in FIG. 1, hammer 58 is shown in an impact ready position. It is manually moved to this position as the user grasps the impact member 58 and moves it upwardly along handle 46. The other hand of the user grasps handle 59 located at the outer free end of handle 46. The wedge tool bit 49 is placed at the end of a wood log 60 in this embodiment. The impact hammer member 58 is forcefully moved downwardly against the impact receiving cap 44. The impact force is transmitted to the log 60 via the housing 42, head 48 and tool bit 49 to effectuate the splitting of log 60.

Prying members 52 having an outwardly projecting portion 53 are disposed on either side of housing 42 at the ends of bolt 54. If the wedge tool bit 49 becomes stuck in the log 60, another elongated member such as a crowbar (not shown) may be used to disengage the wedge tool bit 49 from the log 60.

Figure 3:
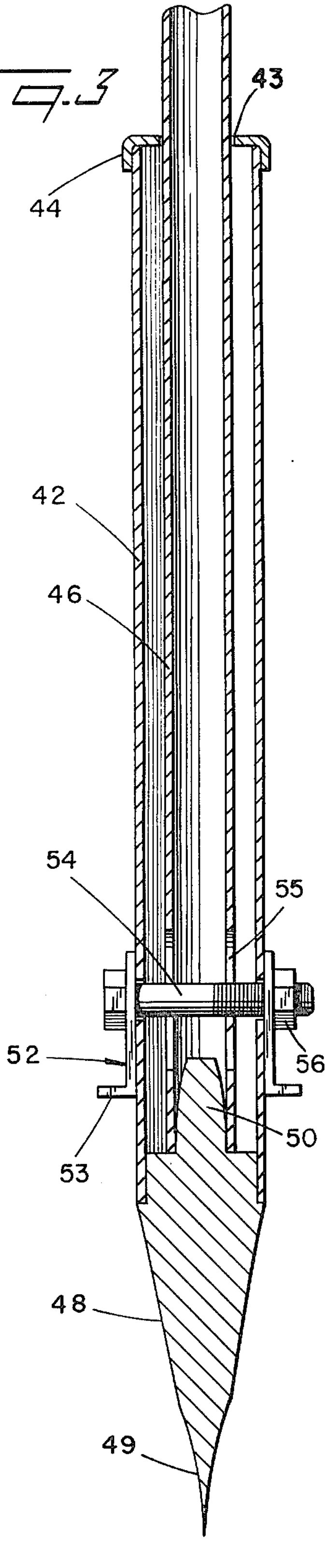
FIG. 3 is a fragmentary sectional view of a first embodiment of a tool made in accordance with this invention.

The connection between the housing 42 and the top of the wedge impact member 48 can be effected through any well known operable method of bonding metal parts together. It is conceivable that the embodiment of FIG. 3 might be modified to include two laterally spaced bolt members 54 with the handle 46 disposed therebetween. A detent of some kind such as a short flange or rods sticking out from either side of the handle 46 might be used to maintain the rod in place when the impact tool 40 is removed from the work area by grasping the handle 59 and carried to another work position.

The point of this invention is that there is no rigid connection between the handle 46, housing 42, cap 44 or working head 48. This constitutes a floating connection which exists between the handle 46 and the working end of the impact tool 40. This obviates the problems associated with fixedly mounted handles which have proven to be subject to breaking when the hammer member 58 is brought down with any force on the top of the impact receiving cap 44. This is the basic problem that is overcome through the configuration of the present application.

Figure 4:
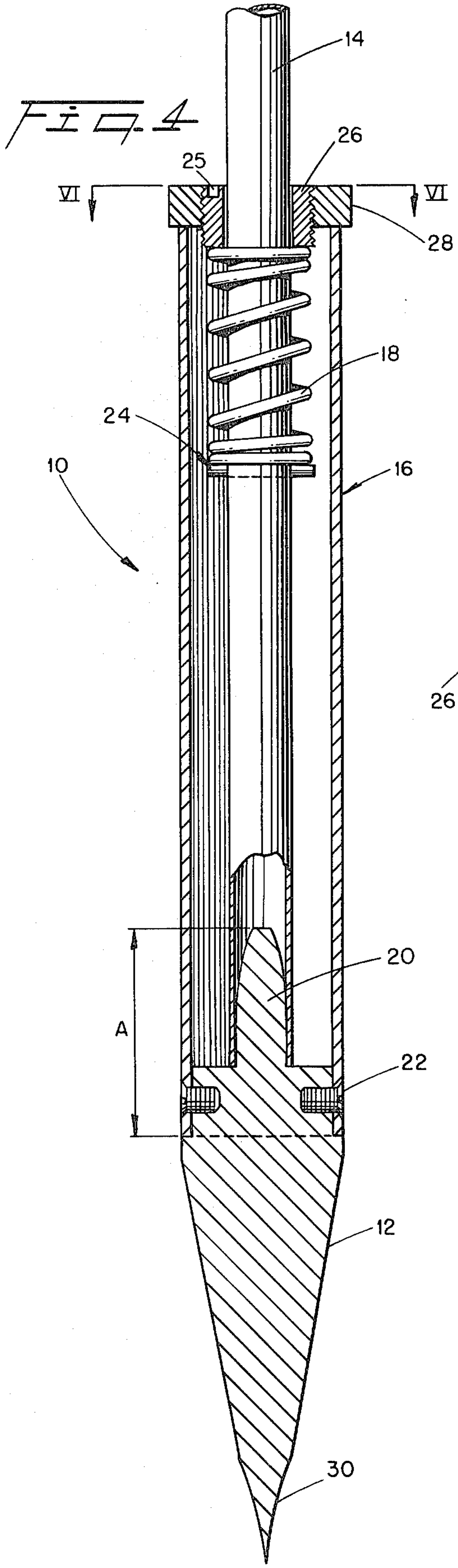
FIG. 4 is a fragmentary sectional view of another embodiment of an impact tool made in accordance with this invention.
Figure 6:
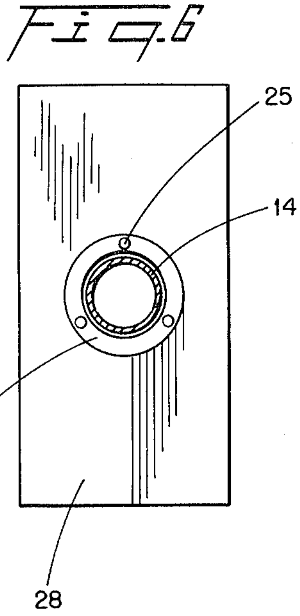
FIG. 6 is a sectional view taken along line VI—VI of FIG. 4.
Figure 5:
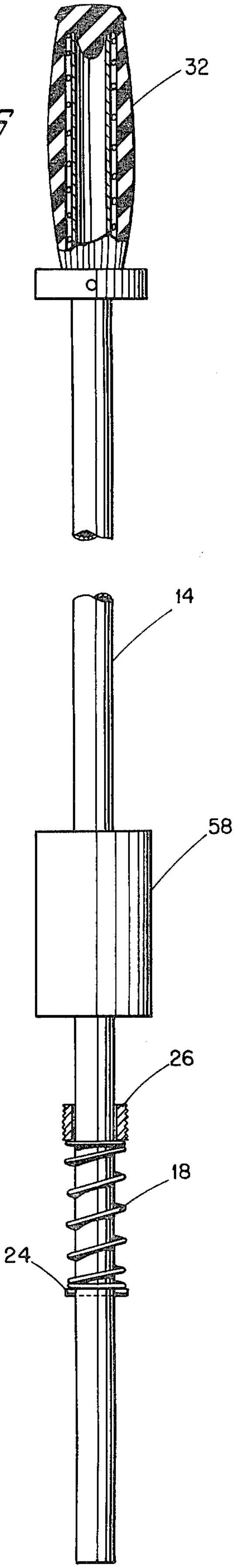
FIG. 5 is a fragmentary sectional view of a handle used in the embodiment as shown in FIG. 4.
Figure 7:
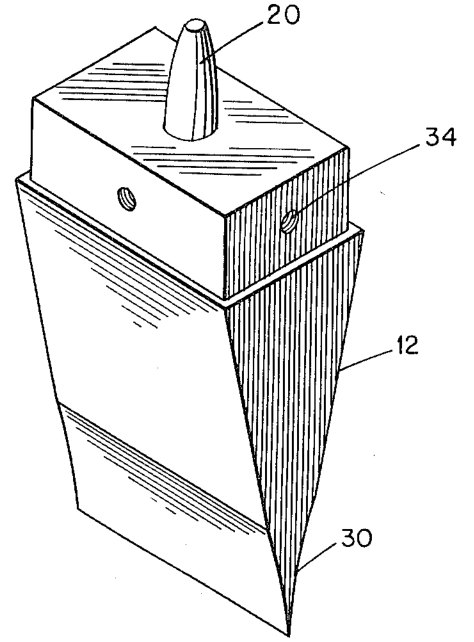
FIG. 7 is a perspective view of a wedge impacting head member made in accordance with this invention.

In the embodiment as shown in FIG. 4, the impact producing tool, generally designated 10, includes a head member having a wedge tool bit 30 floatingly connected to an elongated handle 14. A handle gripping member 32 is located at the distal end of handle 14. Screw members 22 rigidly connect the housing 16 to the top portion of head member 12 as shown. The head member 12 is shown in perspective in FIG. 7 and discloses threaded openings 34 on all four sides thereof into which the screw members 22 are disposed. An annular impact receiving collar or cap 28 is fixedly disposed at the top of the housing 16 which must be formed of material strong enough to maintain its shape while transmitting the force of impact blows on the top of the cap 28 downwardly through head 12 and wedge tool bit 30.

A dampening mechanism is used to dampen any of the force of the impact tool on to the housing 16 and handle 14. That is, the main advantage of the dampening mechanism is to eliminate recoiling forces developed at the time the hammer member 58 strikes the impact receiving cap 28. Again, if elongated handle 14 were rigidly connected to the impact head member 12, the force applied by an impact member 58 develops reactive forces that cause the weight element to recoil and to destroy any rigid connection between the handle 14, head 12 or housing 16.

The dampening mechanism includes a spring member 18 disposed between a flange 24 made of a washer rigidly attached to the outside of the handle 14 and a collar member 26. Collar 26 threadingly engages the cap 28 as shown and there is a sliding contact between the outside of the handle 14 and the inside aperture of collar 26. Indentations 25 are located in collar 26 to effect the turning of the collar into the cap 28. The flange 24 may be replaced by a pin member extending through the handle 14. The inner end of handle 14 fits over a positioning member 20 extending upwardly from the head member 12. The height A in FIG. 4 designates the height of positioning member 20 and height A cannot be shorter than the total displacement of spring 18 during any impact by hammer member 58 onto the upper surface of the impact receiving cap 28. It is possible that the positioning mechanism of the embodiments in this invention may be established in the reverse form i.e. a female member to be formed in the head 12 with the male member being formed as a pointed member at the end of the handle 14.

Figure 8:
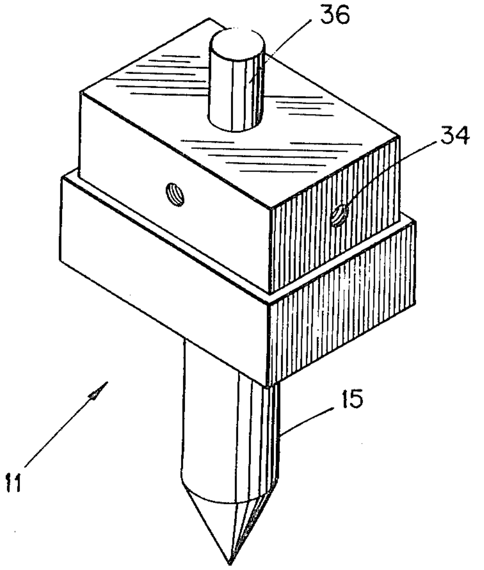
FIG. 8 is a perspective view of a chisel working head member made in accordance with this invention.
Figure 9:
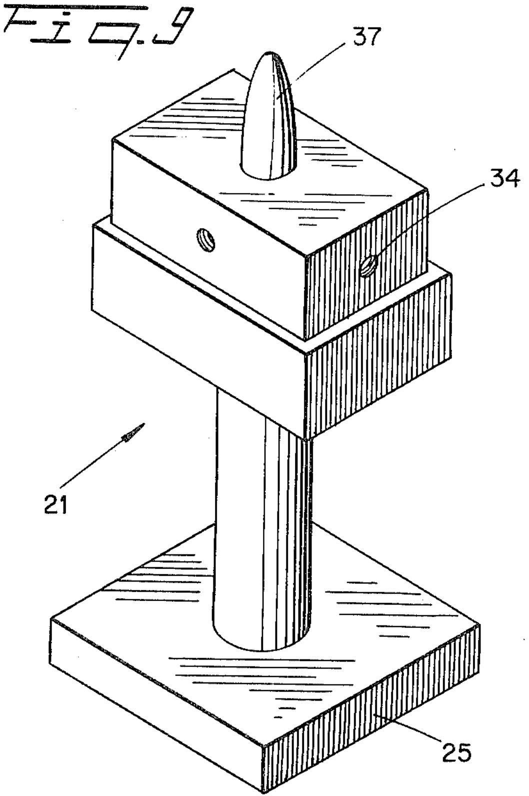
FIG. 9 is a perspective view of a tamping working head member made in accordance with this invention.
Figure 10:
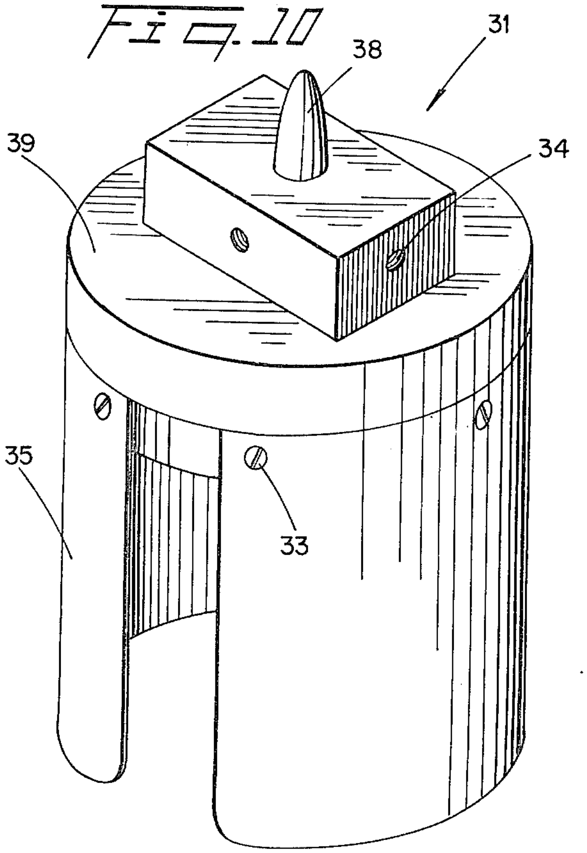
FIG. 10 is a perspective view of a hole-digging head member made in accordance with this invention.

The embodiment of FIG. 4 may have several different kinds of working members located thereon. Each of the embodiments shown in FIGS. 7 through 10 include a connecting portion having threaded openings 34 for receiving screws 22. Thus, the various embodiments shown in FIGS. 7 through 10 may be easily interchanged with respect to the impact producing device 10 shown in FIG. 4. The working head member 11 includes a ground penetrating stake 15 used to form holes in the ground or for stumping. The working head member 21 includes a tamping element 25 used for tamping dirt or the like. The working head member 31 includes a cylindrical cutting member mounted to a base member 39 via screws 33. Positioning member 38 is an elongated conical structure in the embodiment of FIG. 10 while the positioning member 37 has substantially the same kind of shape in the embodiment shown in FIG. 9. The positioning member 36 shown in the embodiment of FIG. 8 is a cylindrical shape and fits within the inside diameter of the tubular handle 14 as shown in the embodiment of FIG. 4. The working head member 31 of FIG. 10 is used to dig holes such as for fence posts. In each instance, an impact is effected by moving the hammer member 57 up and down along the elongated handle 46 or 14 to transmit an impact force through the particular working head member on to the workpiece or working surface.

While the impact producing tool has been shown and described in detail, it is obvious that this invention is not to be considered as being limited to the exact form disclosed, and that changes in detail and construction may be made therin within the scope of the invention without departing from the spirit thereof.

Having thus set forth and disclosed the nature of this invention, what is claimed is:

1. An impact producing tool having a longitudinal axis, said tool comprising:
(a) an impacting head member including a working member located at the end of a housing,
(b) an elongated handle floatingly connected to and extending from the impacting head member,
(c) positioning means located on the impacting head member and having a structural configuration effective to maintain the elongated handle at a predetermined position with respect to the impacting head member,
(d) hammer means movably disposed on the elongated handle and being effective to apply a striking force to the impacting head member, and
(e) said impacting head member having a structural configuration effective to act on a workpiece of a work surface when the striking force is applied thereto,
(f) the elongated handle including dampening means disposed inside the housing and being effective to provide a biased relationship between the handle and the housing,
(g) said dampening means being effective to prevent recoiling of the hammer means when the hammer means strikes the end of the housing opposite said working member.

2. A tool as defined in claim 1, wherein
the elongated handle is a tube, and
the positioning means is a male member located on the head member and protruding into one end of the elongated tube.

3. A tool as defined in claim 1, wherein
the housing is rigidly connected at one end thereof to the working member and has an impact receiving portion with an opening for receiving said handle at the other end thereof,
said dampening means includes biasing means and means for retaining said biasing means,
said retaining means being attached to the elongated handle and disposed in said housing intermediate the two ends of the handle,
said biasing means being disposed on the elongated handle between said opening and said retaining means.

4. A tool as defined in claim 3, wherein
said impact receiving portion includes a cap member fitted over the housing,
said opening being located in the cap member and being defined by a collar removably and coaxially disposed in said cap member.

5. A tool as defined in claim 4, wherein
the biasing means is a helical spring abutting said collar.

6. A tool as defined in claim 1, wherein
the hammer means is a cylindrical weighted element freely movably mounted on the elongated handle and having sufficient weight to cause said working head member to transmit force to the workpiece of a work surface.

7. A tool as defined in claim 1, wherein
said impacting head member includes a removably mounted working head portion disposed on a housing.

8. A tool as defined in claim 7, wherein
the working head portion has a cutting edge for splitting wood.

9. A tool as defined in claim 7, wherein
the working head portion has a pointed tool bit for penetrating hard objects such as earth, rock, metal and the like.

10. A tool as defined in claim 7, wherein
the working head portion has a flat tamping surface element.

11. A tool as defined in claim 7, wherein
the working head portion has a hollow structure for digging holes in the earth.

12. A tool as defined in claim 1, wherein
the impacting head member is rigidly connected at one end of a housing,
the elongated handle means projects into the housing and includes a slotted opening extending lengthwise of the elongated handle member,
a bolt means extends through two opposing sides of the housing and said slotted opening.

13. A tool as defined in claim 12, wherein
prying means are disposed at an end of said bolt means and outside said housing to enable to tool to be loosened from any workpiece or work surface in which the working head member may become stuck.

* * * * *